(12) United States Patent
Dinoff et al.

(10) Patent No.: US 9,185,239 B2
(45) Date of Patent: Nov. 10, 2015

(54) TONE ADVISOR, A TONE ASSISTING SYSTEM AND A METHOD OF ASSOCIATING TONES WITH CALLERS

(75) Inventors: Robert K. Dinoff, Bridgewater, NJ (US); Tin Kam Ho, Cedar Grove, NJ (US); Richard B. Hull, Chatham, NJ (US); Bharat Kumar, Bridgewater, NJ (US); Daniel Francis Lieuwen, Somerville, NJ (US); Haobo Ren, New Providence, NJ (US); Paulo A. Santos, Morganville, NJ (US); Anwar I. Walid, Watchung, NJ (US)

(73) Assignee: Alcatel Lucent, Boulogne-Billancourt (FR)

( * ) Notice: Subject to any disclaimer, the term of this patent is extended or adjusted under 35 U.S.C. 154(b) by 2355 days.

(21) Appl. No.: 11/744,748

(22) Filed: May 4, 2007

(65) Prior Publication Data

US 2008/0273689 A1    Nov. 6, 2008

(51) Int. Cl.
*H04M 3/00* (2006.01)
*H04M 19/04* (2006.01)
*H04M 1/2745* (2006.01)
*H04M 1/57* (2006.01)

(52) U.S. Cl.
CPC ........ *H04M 19/04* (2013.01); *H04M 1/274583* (2013.01); *H04M 1/57* (2013.01)

(58) Field of Classification Search
CPC ..... H04M 7/006; H04M 3/4878; H04M 3/51; H04M 3/5175; H04M 3/54; H04M 15/41; H04M 19/041; H04M 1/57; H04M 1/72522; H04M 1/7253; H04M 3/02; H04M 3/42229; H04M 3/533; H04M 15/04
USPC ............. 379/77, 82, 88.24, 164, 179, 207.09, 379/207.16, 211.03, 211.04, 252, 256, 257, 379/373.01–376.02, 361, 375.01, 418, 911; 455/401, 567, 702
See application file for complete search history.

(56) References Cited

U.S. PATENT DOCUMENTS

| | | | |
|---|---|---|---|
| 6,778,648 B1* | 8/2004 | Alston et al. | 379/93.27 |
| 7,277,691 B1* | 10/2007 | Lundy et al. | 455/401 |
| 2004/0198427 A1* | 10/2004 | Kimbell et al. | 455/556.1 |
| 2005/0143103 A1* | 6/2005 | Bjorgan et al. | 455/466 |
| 2006/0206604 A1* | 9/2006 | O'Neil et al. | 709/223 |
| 2007/0028264 A1* | 2/2007 | Lowe | 725/35 |
| 2007/0116253 A1* | 5/2007 | Batni et al. | 379/399.01 |
| 2007/0123234 A1* | 5/2007 | Kim | 455/414.1 |
| 2007/0133785 A1* | 6/2007 | Cotignola et al. | 379/373.01 |
| 2007/0291931 A1* | 12/2007 | DeMent | 379/418 |
| 2008/0089497 A1* | 4/2008 | Walter et al. | 379/102.02 |
| 2009/0116624 A1* | 5/2009 | Xue | 379/87 |

* cited by examiner

*Primary Examiner* — Akelaw Teshale
(74) *Attorney, Agent, or Firm* — Hitt Gaines, P.C.

(57) ABSTRACT

A tone advisor, a tone assisting system and a method of associating tones with callers. In one embodiment the method includes: (1) monitoring calls to and from a user, (2) obtaining information based on the calls and (3) categorizing a caller associated with at least one of the calls into a contact group according to the information and (4) assigning a genre of tones to the contact group.

34 Claims, 7 Drawing Sheets

TONE ADVISOR, A TONE ASSISTING SYSTEM AND A METHOD OF ASSOCIATING TONES WITH CALLERS

TECHNICAL FIELD OF THE INVENTION

The present invention is directed, in general, to enhancements for a telephone and, more specifically, to assisting a telephone user in associating ring tones or ring-back tones to callers.

BACKGROUND OF THE INVENTION

Telephone users, particularly users of wireless telephones such as cell phones, have the option of associating ring tones with calling parties (callers) that allow the users to identify the callers through audio recognition without visually identifying the caller via caller identification. A user can use existing ring tones provided on the cell phone or can download desired ring tones. Users can also associate personalized ring-back tones with callers to play for the callers after dialing and prior to the call being answered at the receiving end.

A user can manually assign a unique ring tone or ring-back tone for each caller (i.e., a known phone number of the caller). Manually assigning the ring tones or ring-back tones to a caller, however, requires the user's time and the knowledge needed to accomplish the task. This may be even more difficult based on the number of callers associated with the user.

Accordingly, what is needed in the art is an apparatus and system that reduces a user's involvement in assigning tones to callers associated with the user but assigns the tones based on the user's preferences.

SUMMARY OF THE INVENTION

To address the above-discussed deficiencies of the prior art, the present invention provides a tone advisor, a method of associating tones with callers and a tone assisting system. In one embodiment, the tone advisor includes: (1) a call educator configured to monitor calls to and from a user and provide information based on the calls and (2) a caller organizer configured to categorize a caller associated with at least one of the calls into a contact group according to the information and assign a genre of tones to the contact group.

In another aspect, the invention presents a method of associating tones with callers. In one embodiment the method includes: (1) monitoring calls to and from a user, (2) obtaining information based on the calls and (3) categorizing a caller associated with at least one of the calls into a contact group according to the information and (4) assigning a genre of tones to the contact group.

In yet another aspect, the invention provides a tone assisting system. In one embodiment, the tone assisting system includes: (1) a tone reservoir for storing tones used as a ring-back tone or a ring tone in association with a telephone and (2) a tone advisor coupled to the tone reservoir. The tone advisor includes: (2A) a call educator configured to monitor calls to and from the telephone and provide information based on the calls and (2B) a caller organizer configured to categorize a caller associated with at least one of the calls into one of multiple contact groups according to the information, assign an importance to the caller based on the information and assign a genre of tones to the contact group based on the importance.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
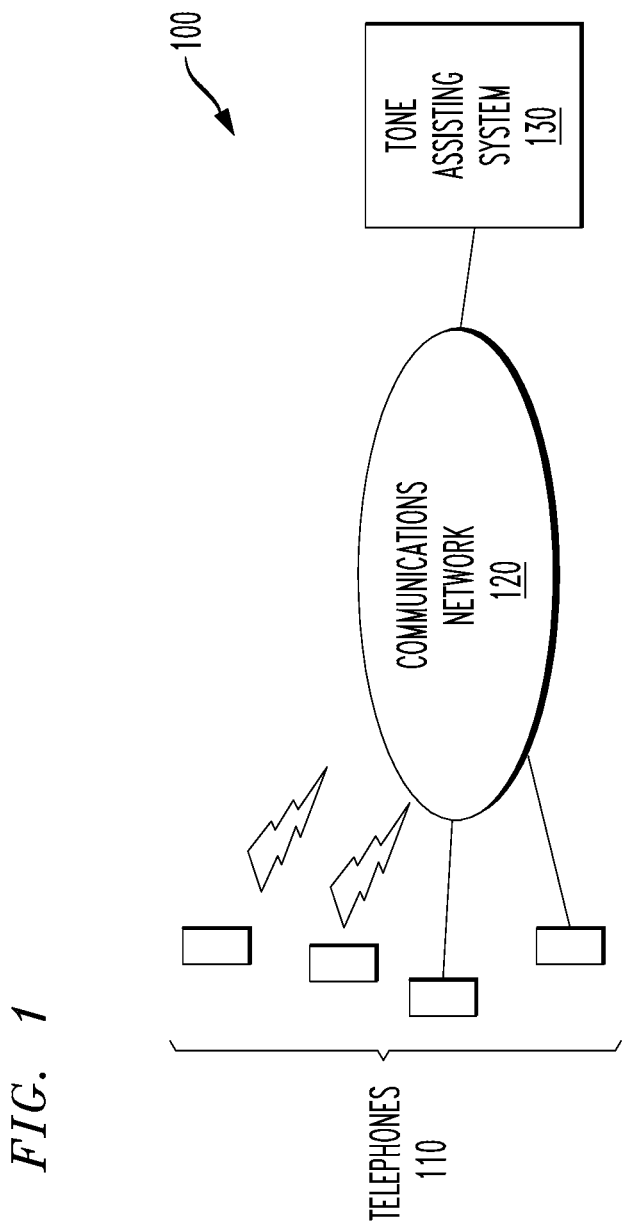
FIG. 1 illustrates a system diagram of an embodiment of a communications network representing an environment for a tone assisting system constructed according to the principles of the present invention.

The present invention uses learning techniques to cluster callers for a particular user into categories, or contact groups. A contact group is a group of callers that has been established based on a relationship to a user of the telephone. For example, one contact group may include family members. Other examples of contact groups are friends, work associates including colleagues and customers, organization members, etc. Users can manually create the contact groups and place callers in one of the contact groups. This can be done, for example, in the user's address book. Additionally, callers may be automatically categorized in a contact group based on the actions of the user. In other words, a caller may be placed in a particular contact group based on how the user similarly treats other callers already in the particular contact group (e.g., those who call frequently and have their calls picked up, those who are called frequently, those whose calls and are ignored, etc.). Thus, the relationship may be learned, retrieved from existing "address book"-style information, or both. A caller can belong to multiple manually-created and system-learned groups. The invention can then suggest a tone to associate with the caller from within the genre of one of the groups in which the caller is associated.

The present invention also uses learning techniques to determine the importance of callers to the user and, based thereon, the importance of the contact group(s) of the caller.

The importance of a caller to a user can be determined based on the calling frequency and "pick-up" (answering) probability recorded in a call log. Tone genres can then be assigned to a contact group or groups that are important to the user. The genre or genres associated with a tone represent the distinct kind, classification or type of music of the tone, or of other characteristics of the tone. Examples of genres of music include: blues, country, heavy metal, hip hop, jazz, reggae, rock, etc. Examples of non-musical tone genres may include classic "old phone" rings, modern rings, funky rings, etc. And examples of tone genres that are based on auditory features may include loud tones, soft tones, discreet tones, etc. A tone may belong to more than one genre if it shares characteristics of multiple, possibly orthogonal, genre classifications. The system may also create new sub-genres based on taking an existing ring-tone and producing multiple variations in pitch/tempo of that ring-tone.

When such callers or contact groups are identified, the invention assigns a genre to a contact group and a tone from the genre to the caller to be used as a ring tone, a personalized ring-back (i.e., ring-back) tone or both. Assigning a genre and tone is defined as associating a genre with a contact group or a tone with a caller. Assigning may be performed automatically by the invention based on the learning techniques discussed above and below. An assignment is a suggestion to assist the user. An assignment is an educated guess as to what will be helpful to the user. This may be confirmed by, for example, asking the end user or based of preferences previously determined from the user. After assigning and when human factors analysis indicates that contacting the user is appropriate, the assigned genres and tones are suggested to the user. Contacting the user and suggesting the genre and tone may be performed proactively. The user can reject the assigned genre and/or tone, in which case the invention will try to assign them again in another pass over the data. The user can also provision the assigned genre and/or tone as suggested, moving the genre and/or tone from a suggestion to an implementation used in call processing. Provisioning the genre and/or tones, therefore, is defined as a user accepting, and therefore activating, the genre and/or tones that have been assigned. A user may also manually provision a genre and/or tone. The invention may not require contacting the user for permission or confirmation to provision a new tone or genre previously assigned by the invention. User preferences or system settings may not require contacting the user to provision certain genres or tones. Thus, in such embodiments, when an assignment is made by the invention the assigned genre and/or tone can be provisioned. Confirmation may come from the preferences. In some embodiments, a genre or tone assigned by a user is automatically provisioned.

The invention, therefore, assists the user in selecting a ring tone or ring-back tone. The invention can allow the user to choose a tone from various resources including: an existing ring tone owned by the user, a variant in pitch/tempo of an existing ring tone, the ring-back tone used by the caller when the user calls the caller, ring back associated with another associate with similar (learned) characteristics, or a ring tone that can be purchased by the user (perhaps with some suggestions from the invention as to appropriate choices based on musical choices learned from the user).

Turning now to FIG. 1, illustrated is a system diagram of an embodiment of a telecommunications system 100 including a tone assisting system 120 constructed according to the principles of the present invention. The telecommunications system 100 also includes telephones, generally designated 110, and a communications network 120. As illustrated, the telephones 110 may be wireless telephones, such as cell phones.

The telephones 110 may also be wired or wireless telephones using Voice Over IP (VoIP) (e.g., with Session Initiation Protocol (SIP) or Skype). Additionally, the telephones 110 may be employed in a plain old telephone service (POTS) environment.

The communications network 120 is also a conventional communications network that includes the necessary infrastructure, such as wires and antennas, to provide communication paths for telephone calls between the telephones 110 and the necessary equipment to process the calls (call processing) through the network. The communications network 120, for example, may be a conventional cellular network. The communications network 120 may also include a POTS network or a conventional data network being used for VoIP traffic.

The telecommunications system 100 also includes a tone assisting system 130. The tone assisting system 130 provides additional functionality for a telephone user by assisting the user in provisioning tones to callers for ring tones or ring-back tones. The tone assisting system 130 may be implemented in an application layer associated with the telecommunications system 100. For example, the tone assisting system 130 may be implemented on a computer that is designated to provide additional functions for the telecommunications system 100, such as an intelligent peripheral (IP). In some embodiments, the tone assisting system 130 may be implemented in a computer that provides other functions for the telecommunications system 100 such as the call processing. The tone assisting system 130 may be implemented as a sequence of operating instructions, dedicated hardware or a combination thereof. In one embodiment, the tone assisting system 130 may be a dedicated device that is constructed of special-purpose hardware employing a software program that directs its operations. Additionally, the components of the tone assisting system 130 may be distributed into more than one device. In some embodiments, a portion of the tone assisting system 130 may reside within memory of the telephones 110. Components of the tone assisting system 130 may also be provided by different parties. The tone assisting system 130 will be discussed in more detail with respect to FIG. 2.

Figure 2:
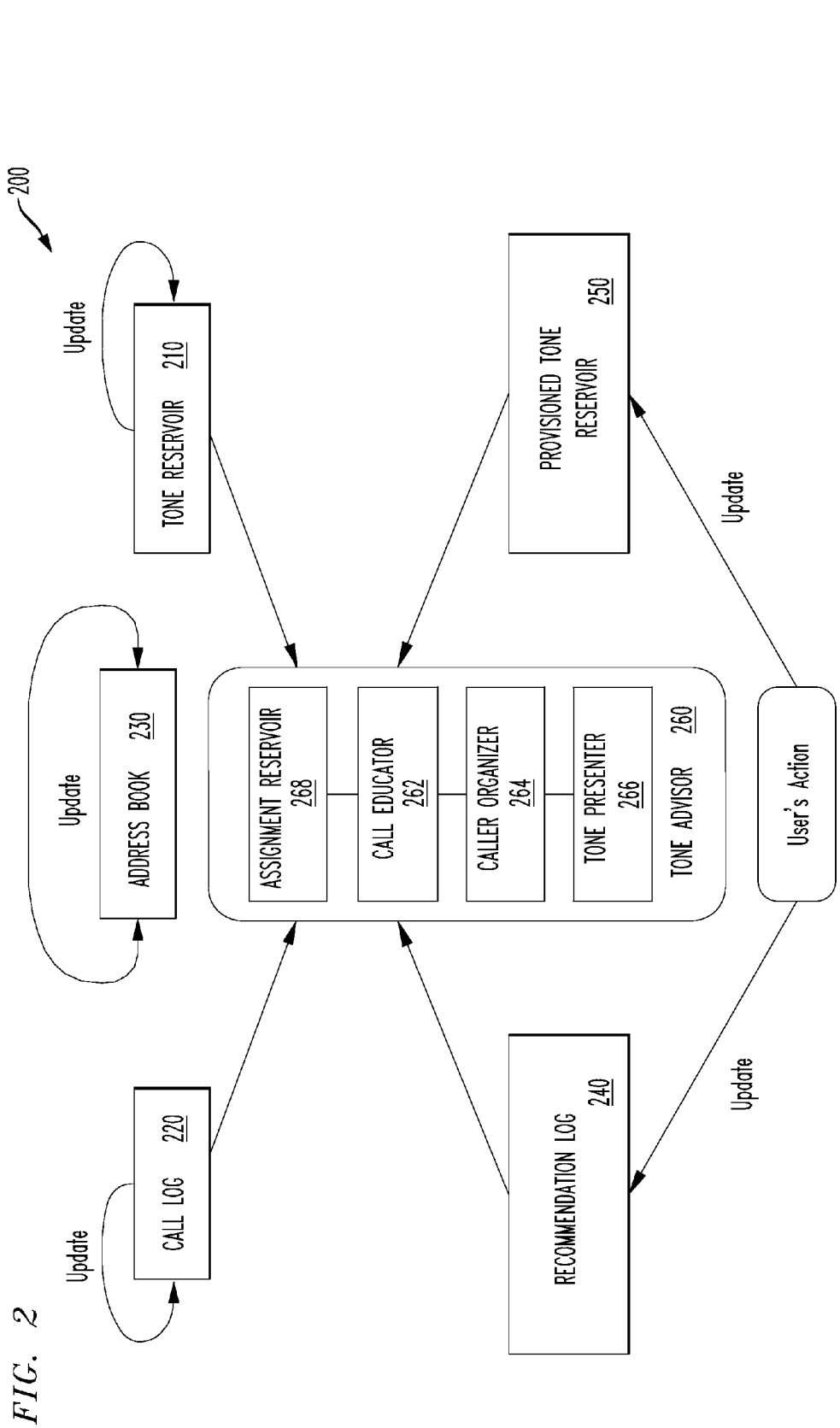
FIG. 2 illustrates a block diagram representing an architecture of an embodiment of a tone assisting system including a tone advisor constructed according to the principles of the present invention.

Turning now to FIG. 2, illustrated is a block diagram representing architecture of an embodiment of a tone assisting system 200 constructed according to the principles of the present invention. The tone assisting system 200 assists a user of a telephone in associating tones to a caller to be used as ring tones or ring-back tones by assigning genres and tones to contact groups and callers, respectively. The tone assisting system 200 includes a tone reservoir 210, a call log 220, an address book 230, a recommendation log 240, a provisioned tone reservoir 250 and a tone advisor 260. The tone assisting system 200 may be implemented within a single computer or multiple computers. For example, the tone reservoir 210, the call log 220, the address book 230, the recommendation log 240 and the provisioned tone reservoir 250 may be partitioned within a single computer or may be located in multiple computers. A part of the tone assisting system 200 may be included on the telephone. Additionally, the tone assisting system 200 may be provided by various parties. For example, the call log 220 could be provided by the telephone's service provider and the tone reservoir 210 could be provided by a media company.

The tone reservoir 210, the call log 220 and the address book 230 are typical components associated with a telephone. The tone reservoir 210 is configured to store tones used in association with the telephone. The tones may be used as a ring-back tone or a ring tone. The tones in the tone reservoir 210 may be provided by the company operating the tone reservoir 210 (e.g., service provider), partners of the tone reservoir operator (e.g., media companies content providers), or other parties (e.g., independent content providers or the user's personal library of tones hosted by a third party). The user may add or delete tones and/or sources of tones from the tone reservoir 210 either through a keypad of the telephone or through a computer network such as the Internet.

The call log 220 records the attributes of calls to and from the telephone. The attributes includes type of the call, time of day of the call, and the length of the call. The address book 230 includes contact information, calendar, etc., used by the user of the telephone. The address book 230 may also include a table listing contact groups and music genres associated therewith.

The recommendation log 240 includes information about the genres and tones that were assigned for the user. Additionally, the recommendation log 240 includes the user's response to the assigned information presented to the user. The recommendation log 240 includes such information as when a tone was purchased, if it was provisioned or assigned and to whom it was provisioned or assigned and the genre of music of the tone. The recommendation log 240 may contain tones that are not (yet) in the provisioned tone reservoir 250. Additionally, an assignment reservoir 268, addressed below, may include assigned tones. The provisioned tone reservoir 250 can include all the tones provisioned to a contact group or an individual caller (who may be a member of one or more contact groups).

The tone advisor 260 includes the logic that learns the preferences of the user and applies the learned knowledge to provision the tones for the user. The tone advisor 260 may be implemented as a series of operating instructions, dedicated hardware of a combination thereof. The tone advisor 260 may also be implemented on one or multiple computing devices.

The tone advisor 260 includes a call educator 262, a caller organizer 264, a tone presenter 266 and an assignment reservoir 268. The call educator 262 is configured to monitor calls to and from the telephone and provide information based on the calls. The information may be obtained from the tone reservoir 210, the call log 220, the address book 230, the recommendation log 240, the provisioned tone reservoir 250 or a combination thereof. Data from one or all of these resources may used as the information about the calls. Of course, information about the calls may also be obtained from other resources. The information may also be obtained based on the actions of the user in response to a call. For example, the user may answer the call, return the call, ignore the call or leave a message. This information may be retrieved from the call log 220.

The caller organizer 264 is configured to categorize a caller associated with at least one of the calls into one of multiple contact groups according to the information. The caller organizer 264 employs algorithms represented by a sequence of operating instructions to analyze and learn from the information to categorize the caller according to characteristics of the user. Each of the contact groups has been established based on a relationship to a user of the telephone. The relationship may be learned by the call organizer 264 or retrieved from the address book 230. The call organizer 264 can use learning, user groups that exist in a user's address book, or both.

The tone presenter 266 is configured to suggest an assigned tone of the genre of tones for the user to associate with the caller. The tone may belong to the genre of one of the user's groups containing the caller. The tone may be a tone already provisioned to some members of that group, a variation of such a tone in pitch/tempo, or a completely new tone. The tone assisting system 200 might treat the caller as a standalone unit and instead suggest a ring-back (or variant in pitch/tempo) of the ring-back used by the caller when the user calls the caller. The tone assisting system 200 could simply recommend a tone of a type known or believed by the tone assisting system 200 to be popular with the user, based on user preferences or learning. The tone presenter 266 may proactively suggest the assigned tone to the user. In some embodiments, the tone presenter 266 may proactively suggests the assigned tone to the user at completion of the call. For example, the tone presenter 266 can provide a display on a screen of the telephone having a suggested tone for the user to assign to the caller after the user hangs-up. The display can offer the choice to assign the tone to the individual or one or more groups the user belongs to or to reject the tone. The display can also include a price to acquire the assigned tone. If the user declines the tone, the user can be asked the reason (e.g., too expensive, don't like the genre, like the genre but not the tone, etc.). The tone can be acquired through downloading. The user's decision (the tone purchased along with information about the tone such as the genre or the tone rejected along with the reason for the rejection if given) is stored in the recommendation log 240. The assignment reservoir 268 includes assigned tones.

The tone presenter 266 is also configured to determine when to proactively suggest the assigned tone to the user based on human factors of the user. To accomplish this, the tone presenter 266 may examine the user's calendar to determine if the user is in a meeting, traveling, at lunch, etc. Additionally, the tone presenter 266 may determine from the recommendation log 240 when the user has previously purchased tones and when the user has refused to purchase tones.

Figure 3:
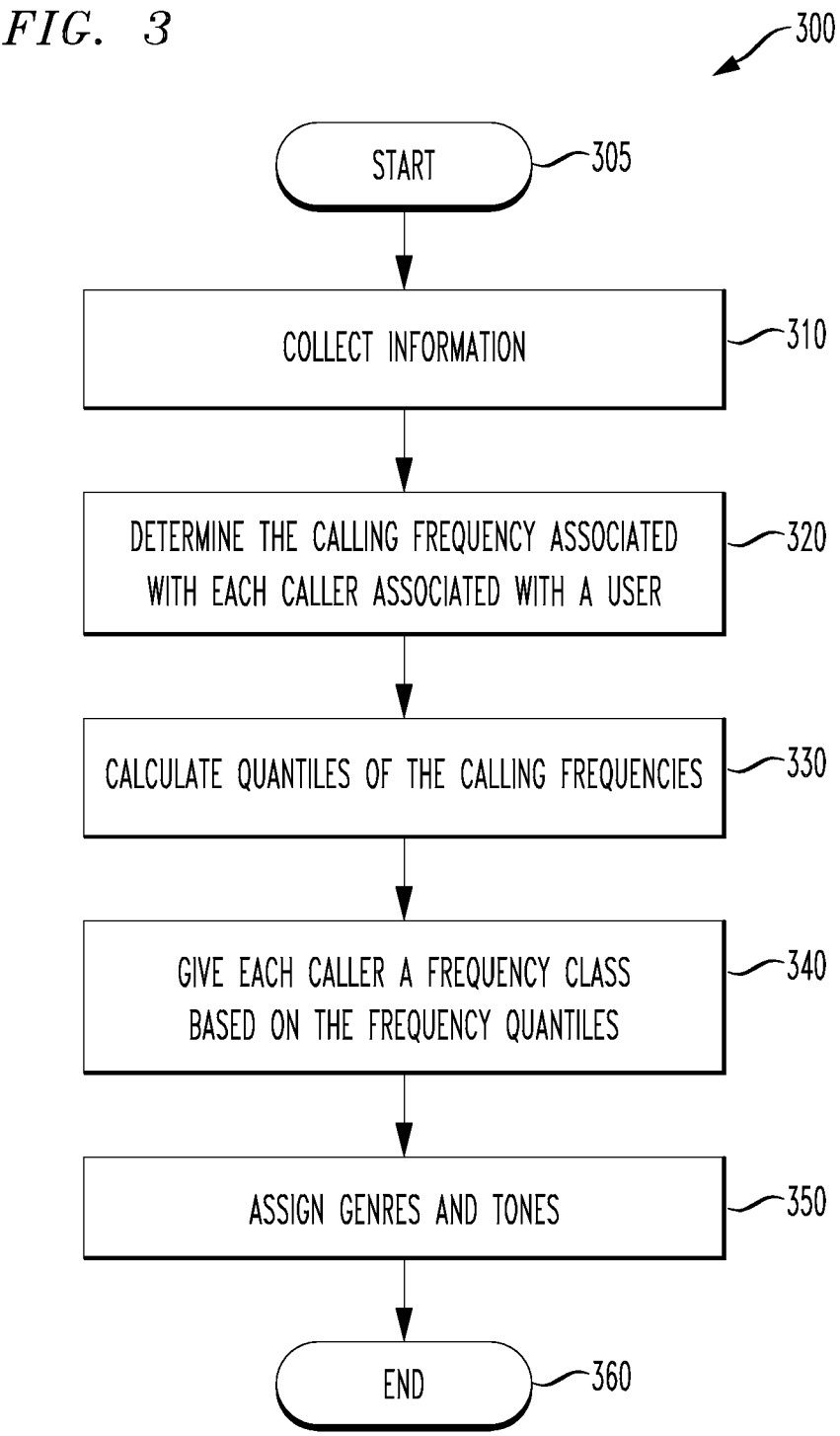
FIG. 3 illustrates a flow diagram representing an embodiment of analysis performed by a tone advisor carried out according to the principles of the present invention.
Figure 4:
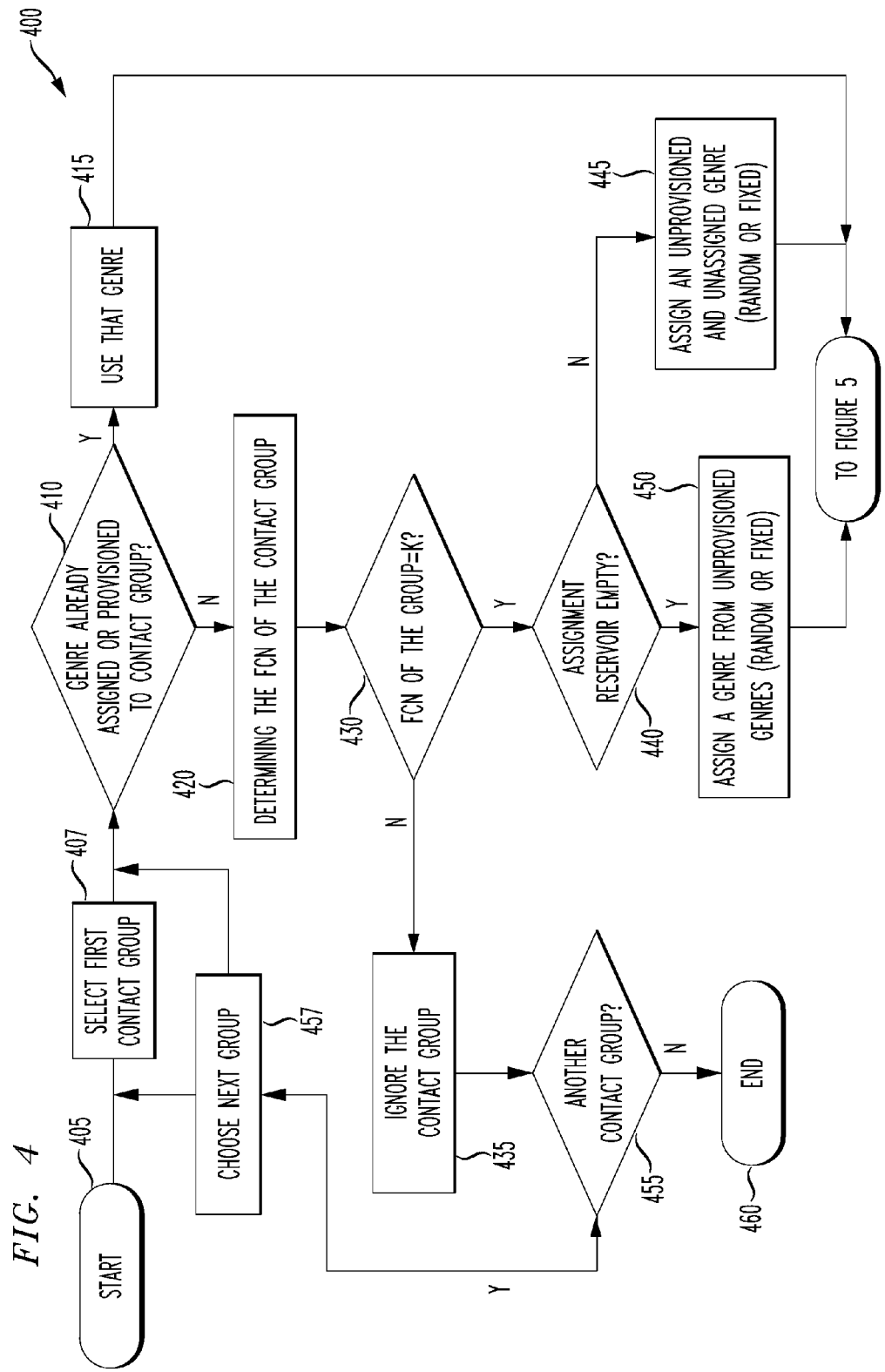
FIG. 4 illustrates a flow diagram representing an embodiment of assigning a genre to a contact group carried out according to the principles of the present invention.
Figure 5:
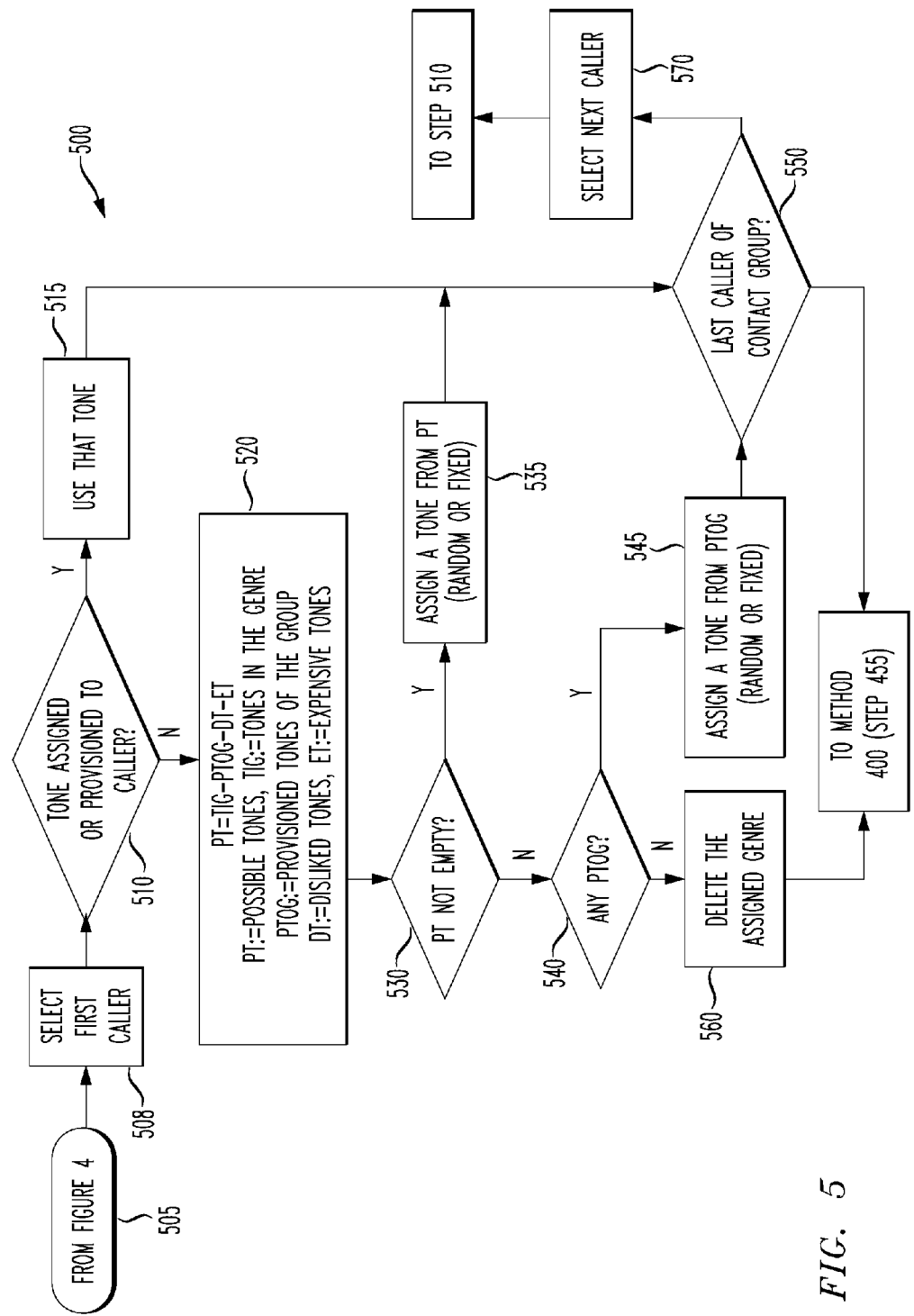
FIG. 5 illustrates a flow diagram representing an embodiment of assigning a tone to a caller carried out according to the principles of the present invention.

FIG. 3 illustrates a flow diagram representing an embodiment of a method 300 of analysis performed by a tone advisor carried out according to the principles of the present invention. The method 300 represents a general analysis for assigning a genre to a contact group which leads to assigning a tone to a caller. FIGS. 4-5 provide more detail for assigning genres to contact groups and assigning tones to callers in the contact groups. The analysis begins in a step 305 with intent to assign a genre of tones.

The method 300 continues by collecting information associated with a telephone of a user in a step 310. The information may be obtained from a tone reservoir, an address book, a call log, a provisioned tone reservoir, a recommendation log and/or other databases having information associated with the telephone. The information may include genre or tone data, contacts groups or callers. Additionally, the information can include user's preferences from, for example, the recommendation log. Such preferences could include disliked tones, price limit, preferred genres, etc.

After collecting information, the calling frequency of each caller associated with the user is determined in a step 320. The calling frequency may be determined by the number of calls from each caller that was attempted and/or accepted according to a calling log per a designated time period. The time period may be a day, a week, a month, or another period of time. A call educator or a call organizer may obtain the number of calls from the calling log to determine the calling frequencies.

After determining the calling frequencies, quantiles of the calling frequencies are calculated in a step 330. The callers are divided into approximately K equal sized groups based on their calling frequencies. The size of the groups and the number of quantiles can vary based on factors such as, the number of callers, user preferences, usage history, etc. Nevertheless, each caller is in one of the K quantiles. The value of K may be fixed for the system or may vary for different users. It is a constant, however, for any given user. One skilled in the art will understand calculating quantiles and that other binning techniques may be used. For example, other "clustering techniques" can be k-means method, Guassian mixture estimation, hierarchical clustering, etc.

After calculating quantiles, each caller is then given a frequency class number based on their frequency quantile in a step 340. The frequency class number represents the number of calls associated with a caller. Thus, the $K^{th}$ quantile includes those callers having the most calls with the user. Accordingly, the $K^{th}$ quantile callers are deemed to be the most important callers. A caller organizer may calculate the quantiles of the calling frequencies and assign the frequency class number.

After giving each caller a frequency class number, a genre of music is assigned to each important contact group and a tone is assigned to callers in a step 350. Assigning a genre to a contact group is explained in more detail with respect to FIG. 4. Assigning a tone to a caller is explained in more detail with respect to FIG. 5. After assigning genres and/or tones, the method 300 ends in a step 360.

Turning now to FIG. 4, illustrated is another flow diagram representing an embodiment of a method 400 of analysis performed by a tone advisor carried out according to the principles of the present invention. The method 400 begins in a step 405 with intent to assign a genre of music to contact groups. After beginning, a first contact group is selected in a step 407. The first contact group that is used may be chosen alphabetically. Of course, the first contact group may be chosen randomly or based on other criteria.

After beginning, a determination is made in a first decisional step 410 if a genre has already been assigned or provisioned to the contact group. A genre may already, for example, be provisioned to the contact group manually by the user and stored in a tone reservoir. This may be determined by looking at a table in the address book. Alternatively, one may have been assigned by the system, but not accepted (provisioned) or rejected by the user.

If a genre has not been assigned, the frequency class number of the contact group is determined in a step 420. The frequency class number of the contact group is determined based on the maximum value of the frequency class numbers of the callers in the contact group (as discussed with respect to step 340 of FIG. 3). For example, the contact group may include a caller or several callers having a frequency class number of K. As such, the frequency class number of the contact group will be K since K is the largest quantile value.

A determination is then made in a second decisional step 430 if the frequency class number of the contact group is equal to K. As noted above, K represents an important caller to the user based on the number of calls (a member of the most important quantile). The method 400, therefore, is able to determine if there are any important callers in the particular contact group. In some embodiments, multiple quantiles, such as the top several quantiles, may be used. If so, step 430 could determine if the frequency class number of the contact group is greater than or equal to X where X is less than or equal to K.

If the frequency class number is equal to K, then a determination is made in a third decisional step 440 if there are assigned genres in an assignment reservoir. Assigned genres can be stored temporarily by a tone advisor in the assignment reservoir.

If the assignment reservoir is empty, then a genre is assigned to the contact group in a step 450 from unprovisioned genres. The available genres may be obtained from a tone reservoir. A variety of methods can be used for the genre assignment including random, some fixed order, an order based on user preferences, the genre of some existing member (if any) of the group previously assigned a tone as an individual, and so on. The method 400 then proceeds to method 500 (step 508) illustrated in FIG. 5. In method 500, each caller in the contact group is assigned a tone as discussed below.

Turning back to the decisional steps, in the first decisional step 410, if a genre is already assigned or provisioned to the contact group, the method proceeds to step 415 where that genre is copied. In other words, the already assigned or provisioned genre remains with the contact group. Once a genre is assigned, the genre stays assigned unless the user indicates that the genre is inappropriate or the learning algorithm learns that music from this genre is not purchased. The de-assignment can be done either right after the user tells the system not to use the genre or after a periodic procedure traverses a recommendation log looking for assignments to remove. The method 400 then proceeds to method 500.

In the second decisional step 430, if the frequency class number does not equal K, then the contact group is ignored in a step 435. Accordingly, a genre is not assigned to the contact group. In other words, the contact group does not include a sufficiently important caller to warrant assigning a genre. After step 435, the method 400 continues to a fourth decisional 455 where a determination is made if there is another contact group. If there is, the method 400 continues to a step 457 where the next contact group is selected. The method 400 then continues to step 410 for that group. If there is not another contact group, the method 400 ends in a step 460.

In the third decisional step 440, if the assignment reservoir is not empty, then an as-yet-unprovisioned and unassigned genre is assigned to the contact group in a step 445. (The number of genres is sufficiently large that there should always be an available genre; perhaps created from an existing genre by varying pitch.) A variety of methods can be used for the assignment including random, some fixed order, an order based on user preferences, the genre of some existing member (if any) of the group previously assigned a tone as an individual, and so on. The method 400 then proceeds to method 500. The assigned genre can be stored in an assignment reservoir.

FIG. 5 illustrates a flow diagram of a method 500 of an embodiment of analysis of a tone advisor carried out according to the principles of the present invention. The method 500 addresses assigning tones to callers belonging to a contact group. The contact group has an assigned genre as discussed above with respect to the method 400. The tones that are assigned may be used as ring tones or as ring-back tones. The method may be implemented in a computer through a sequence of operating instructions. The method begins in a step 505 with a contact group that has an assigned genre.

After starting, a determination is made in a step 508 as to who is the first caller in the contact group. The first caller from the contact group may be selected alphabetically or via other criteria, for instance quantile membership. Then, in a first decisional step 510 a determination is made to determine if a tone is already assigned or provisioned to the caller by examining tone/genre assignments and provisions. Existing tone/genre assignments or provisions may be determined, for example, by querying an assignment reservoir and/or a provisioned tone reservoir. If the caller does not already have a tone assigned or provisioned thereto, possible tones that may be assigned are determined in a step 520. The possible tones may be determined by subtracting the provisioned and assigned tones of the contact group, disliked tones and expensive tones (determined by user's preference for maximum price, either assigned by the user explicitly or estimated by the learning algorithm) from the tones in the particular genre associated with the contact group. The provisioned tone, disliked tones and expensive tones may be determined from a provisioned tone reservoir and a recommendation log and/or user preferences associated with the telephone.

After determining the possible tones for assignment, a determination is made in a second decisional step 530 if there are any possible tones available for assignment. If there are not any possible tones available for assignment, then a determination is made in a third decisional step 540 if there are any provisioned tones of the contact group. If there are provisioned tones of the contact group, then a tone from the provisioned tones is assigned to the caller in a step 545. This may lead to sharing of a tone by two or members of a group. The assignment of the tone may be randomly or fixed.

After assigning the tone from the provisioned tones, a determination is made in the fourth decisional step 550 if this is the last caller of the contact group. If it is the last caller, the method 500 continues to step 455 of method 400 and goes to the next contact group. If the caller is not the last caller, then the method 500 continues to a step 570 and selects the next caller. The method 500 then returns to step 510 and proceeds to the next caller of the contact group.

Returning now to the first decisional step, if there is a tone already assigned to the caller, that tone remains assigned to the caller in a step 515. The method 500 then continues to the fourth decisional step 550. At the second decisional step 530, if possible tones are available, a tone is assigned to the caller from the possible tones in a step 535. The tone may be assigned randomly or fixed. The method 500 then continues to the fourth decisional step 550.

Returning to the third decisional step 540, if there are no provisioned tones of the group, then the genre assigned to the contact group is deleted from further consideration for this user in a step 560. This is because there are no tones in the genre that are not either disliked or too expensive. After step 560, the method 500 then proceeds to method 400 (step 455) and the next contact group.

Figure 6:
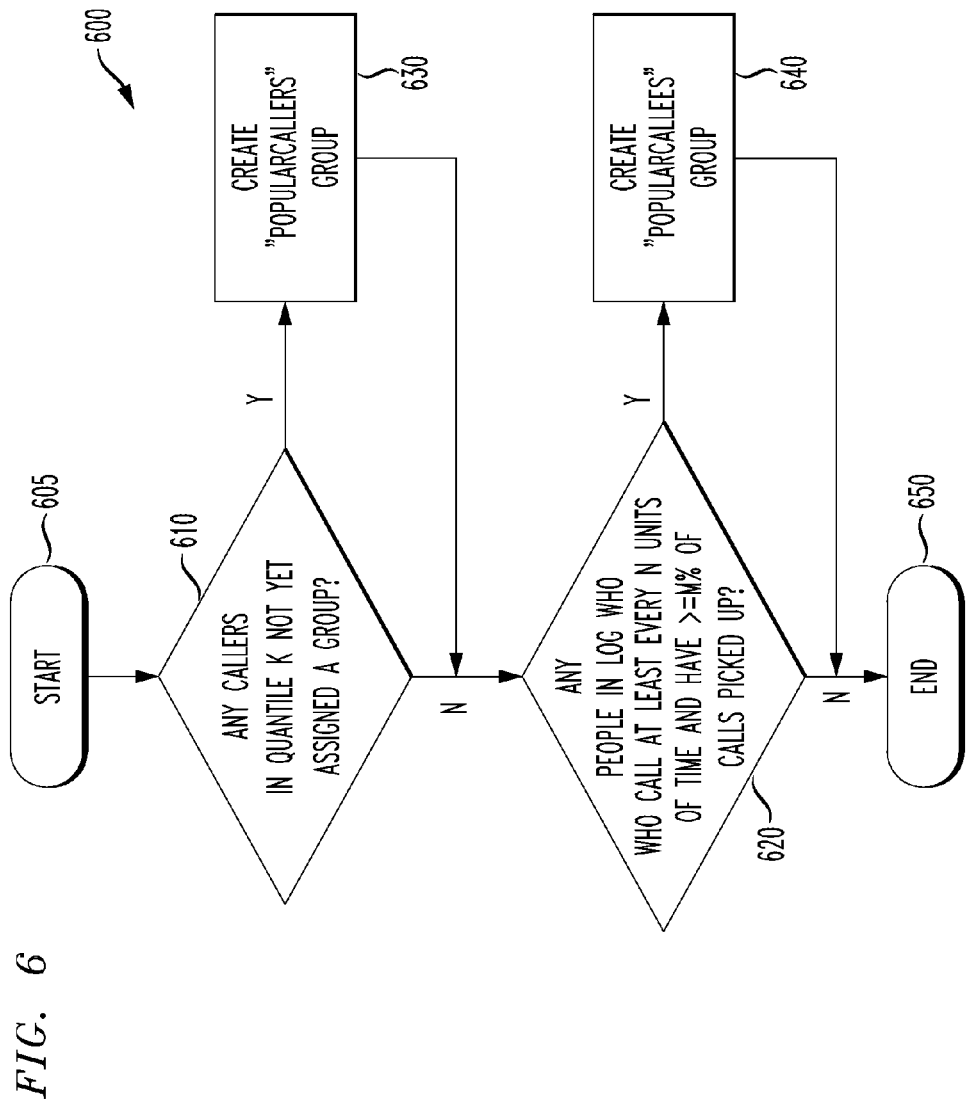
FIG. 6 illustrates a flow diagram representing another embodiment of analysis performed by a tone advisor carried out according to the principles of the present invention.
Figure 7:
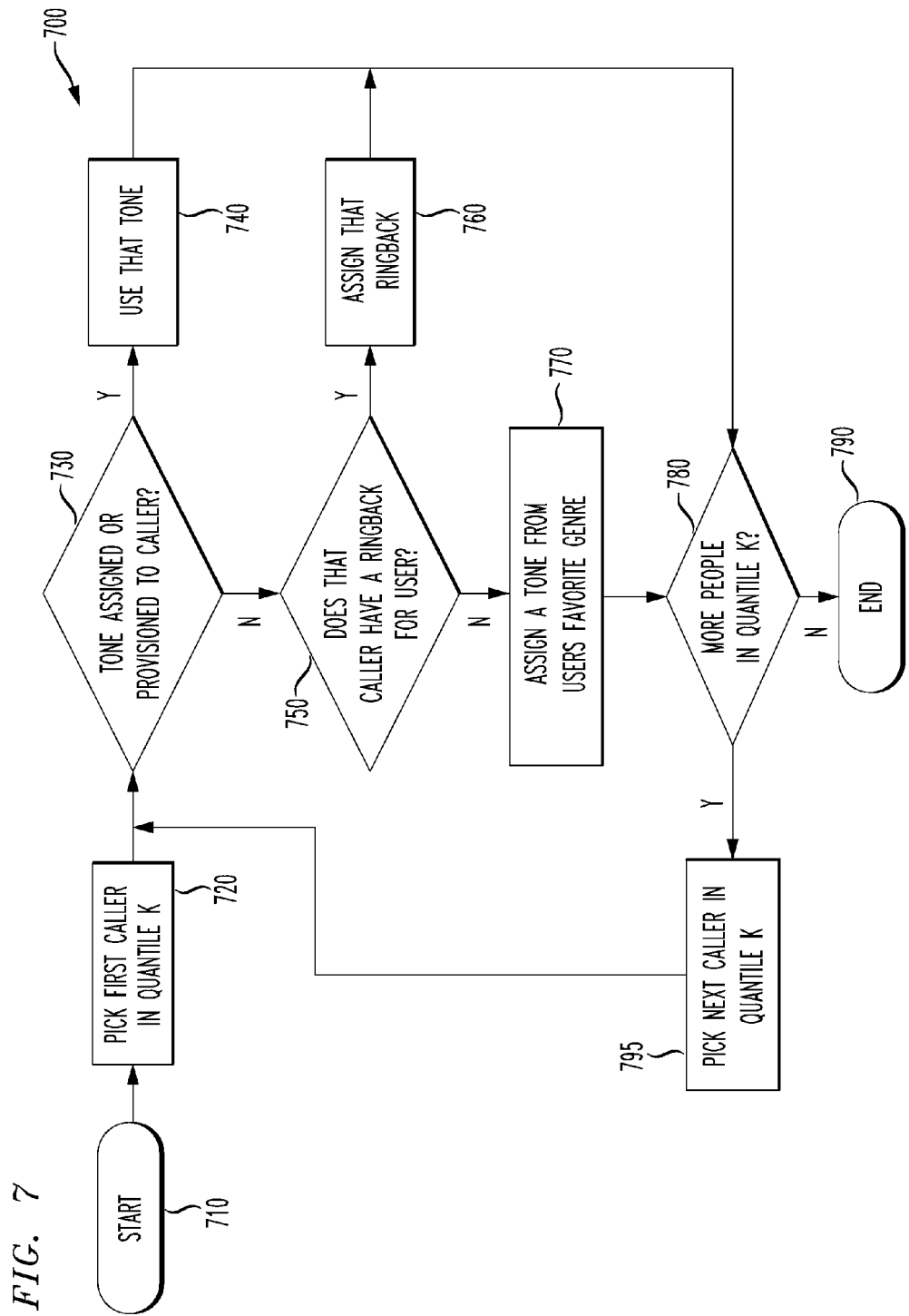
FIG. 7 illustrates a flow diagram representing yet another embodiment of analysis performed by a tone advisor carried out according to the principles of the present invention.

FIGS. 6 and 7 as discussed below present additional logic used by a tone advisor when assisting a user. Of course, one skilled in the art will understand that other logic may be used, also. FIG. 6 illustrates a flow diagram representing another embodiment of analysis 600 performed by a tone advisor carried out according to the principles of the present invention. The method 600 begins in a step 605 with intent to assign important callers to a contact group.

In a first decisional step 610, a determination is made if there are any callers in the $K^{th}$ quantile that have not yet been assigned to a contact group. If there are, a "popular callers" contact group is created in a step 630 and such callers are placed therein. After creating the "popular callers" contact group, the method 600 continues to the second decisional step 620 where a determination is made if there are any people in the call log who call at least N units of time and have greater than or equal to M percentage of calls that are answered by the user. N and M are values that may be selected by the user or assigned by a tone advisor system. If there are, then a "popular callers" contact group is created in a step 640. After creating the "popular callers," the method 600 continues to a step 650 and ends.

Returning now to the decisional steps, if there is no unassigned callers in the $K^{th}$ quantile, then the method 600 proceeds to step 620 and continues. In step 620, if there are no people in the call log who call at least N units of time and have greater than or equal to M percentage of calls that are answered by the user, then the method 600 proceeds to step 650 and ends.

FIG. 7 illustrates a flow diagram representing yet another embodiment of analysis 700 performed by a tone advisor carried out according to the principles of the present invention. The method 700 begins with intent to assign a tone to a user in a step 710.

A caller in the first quantile K is selected in a step 720. A determination is then made in a first decisional step 730 if a tone is assigned or provisioned to the caller. If a tone is not assigned or provisioned, a determination is then made in a step 750 if the caller has a ring-back for the user. A tone advisory system may determine this by interacting with the service provider of the caller.

If the caller does not have a ring-back for the user, then a tone is selected from the user's favorite genre to assign in a step 770. A determination is then made in a third decisional step 780 if there are more callers in the $K^{th}$ quantile. If not, the method 700 ends in a step 790. If there are, the method 700 proceeds to a step 795 and the next caller in the $K^{th}$ quantile is selected. The method 700 then proceeds to step 730.

Returning now the first decisional step 730, if a tone is assigned or provisioned to the caller, then that assigned or provisioned tone is used in a step 740. In step 750, if the caller does use a ring-back for the user, then the ring-back tone is assigned to the caller in a step 760. After step 760, the method 700 proceeds to step 780.

Although the present invention has been described in detail, those skilled in the art should understand that they can make various changes, substitutions and alterations herein without departing from the spirit and scope of the invention in its broadest form.

What is claimed is:

1. A telephone tone advisor, comprising:
    a call educator configured to monitor calls to and from a user and provide information based on said calls; and
    a caller organizer configured to categorize a caller associated with at least one of said calls into a contact group according to said information, assign a frequency class to said caller which represents a number of said calls associated with said caller based on said information, and assign a genre of tones to said contact group based on said frequency class;
    wherein said information includes calling frequency recorded in a call log.

2. The tone advisor as recited in claims 1 wherein said information further includes answering history recorded in said call log.

3. The tone advisor as recited in claim 2 wherein said caller organizer is further configured to assign a tone from said genre of tones to said caller.

4. The tone advisor as recited in claim 3 further comprising a tone presenter configured to suggest said tone for said user to associate with said caller.

5. The tone advisor as recited in claim 4 wherein said tone presenter proactively suggests said tone to said user.

6. The tone advisor as recited in claim 5 wherein said tone presenter proactively suggests said tone to said user at completion of a call.

7. The tone advisor as recited in claim 5 wherein said presenter is configured to determine when to proactively suggest said tone to said user based on at least one of the following factors:
    calendar entries,
    location of a telephone,
    user preferences, and
    usage of said telephone on a communications network.

8. The tone advisor as recited in claim 1 wherein said information pertains to at least one of the following attributes of a call:
- type of said call,
- time of day of said call,
- length of said call,
- location of user at time of said call,
- relationship information about said user and other party in said call,
- user preferences about said call, and
- user calendar entries providing context for said call.

9. The tone advisor as recited in claim 1 wherein said information pertains to at least one of the following actions in response to a call:
- answering said call,
- returning said call,
- ignoring said call,
- listening to said call on voice mail,
- discarding said call from voice mail, and
- leaving a message.

10. The tone advisor as recited in claim 1 wherein said information pertains to frequency of said calls associated with said caller.

11. The tone advisor as recited in claim 1 wherein said information is based on an address book associated with a telephone.

12. The tone advisor as recited in claim 1 wherein said tone is used for a ring-back tone or a ring tone associated with said caller.

13. The tone advisor as recited in claim 1 wherein said caller organizer is further configured to assign a tone to a caller based on a ring-back tone used by said caller for said user.

14. The tone advisor as recited in claim 1 wherein said caller organizer is further configured to assign a tone to an important caller from a favorite genre of said user.

15. The tone advisor as recited in claim 1 wherein said caller organizer is further configured to create a contact group of popular callers.

16. The tone advisor as recited in claim 1 wherein said caller organizer is further configured to create a contact group based on a percentage of said calls that are answered.

17. A method for associating tones with callers, the method carried out by one or more processors comprising:
- monitoring calls to and from a user;
- obtaining information based on said calls;
- categorizing a caller associated with at least one of said calls into a contact group according to said information;
- assigning a frequency class to said caller which represents a number of said calls associated with said caller based on said information; and
- assigning a genre of tones to said contact group based on said frequency class, wherein said information includes calling frequency recorded in a call log.

18. The method as recited in claim 17 wherein said information further includes answering history recorded in said call log.

19. The method as recited in claim 18 further comprising assigning a tone from said genre of tones to said caller.

20. The method as recited in claim 19 further comprising suggesting said tone for said user to associate with said caller.

21. The method as recited in claim 20 wherein said suggesting is performed proactively at completion of a call.

22. The method as recited in claim 20 wherein said suggesting is performed proactively based on at least one of the following factors associated with said user:
- calendar entries,
- location of a telephone,
- relationship information about said user and other party in a call,
- user preferences, and
- usage of said telephone on a communications network.

23. The method as recited in claim 21 wherein said information pertains to at least one of the following attributes of a call:
- type of said call,
- time of day of said call,
- location of user at time of said call, and
- length of said call.

24. The method as recited in claim 21 wherein said information pertains to at least one of the following actions in response to a call:
- answering said call,
- returning said call,
- ignoring said call,
- listening to said call via voice mail,
- discarding said call from voice mail, and
- leaving a message.

25. The method as recited in claim 21 wherein said information pertains to frequency of said calls associated with said caller.

26. The method as recited in claim 21 wherein said information is based on an address book associated with a telephone.

27. The method as recited in claim 21 wherein said tone is used for a ring-back tone or a ring tone associated with said caller.

28. A tone assisting system, comprising:
- a tone reservoir for storing tones used as a ring-back tone or a ring tone in association with a telephone; and
- a tone advisor coupled to said tone reservoir, including:
  - a call educator configured to monitor calls to and from said telephone and provide information based on said calls; and
  - a caller organizer configured to categorize a caller associated with at least one of said calls into one of multiple contact groups according to said information, assign a frequency class to said caller which represents a number of said calls associated with said caller based on said information and assign a genre of tones to said contact group based on said frequency class;
- wherein said information includes calling frequency recorded in a call log.

29. The tone assisting system as recited in claim 28 wherein said caller organizer is further configured to assign a tone from said genre of tones to said caller.

30. The tone assisting system as recited in claim 29 wherein said tone advisor includes a tone presenter configured to suggest said genre and said tone for said user to associate with said contact group and said caller.

31. The tone assisting system as recited in claim 30 wherein said tone presenter proactively suggests said genre or said tone to said user.

32. The tone assisting system as recited in claim 31 wherein said tone presenter proactively suggests said tone or said genre to said user at completion of a call.

33. The tone assisting system as recited in claim 31 wherein said tone presenter is configured to determine when to proactively suggest said tone to said user based on at least one of the following factors:
- calendar entries,
- location of said telephone, relationship information about said user and other party in a call,
user preferences about said call, and
usage of said telephone on a communications network.

34. The tone assisting system as recited in claim 32 further comprising a recommendation log associated with said telephone, wherein said call educator obtains a portion of said information therefrom.

\* \* \* \* \*